June 20, 1961     F. S. MURPHY     2,988,835
DIE-CUT LAMINATED BOARD LETTERS, FIGURES, WORDS, DESIGNS, ETC.
Filed July 30, 1958
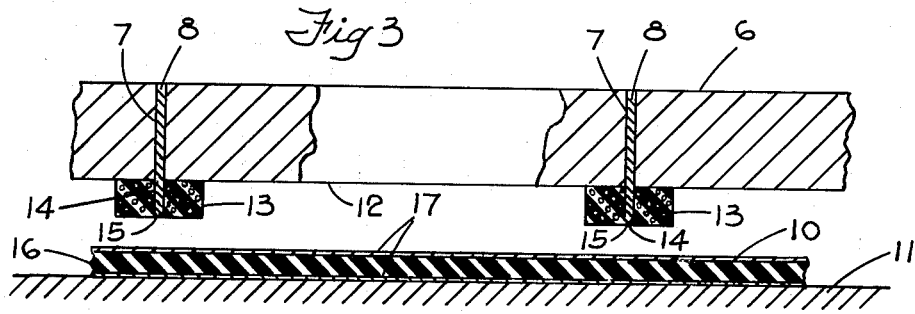
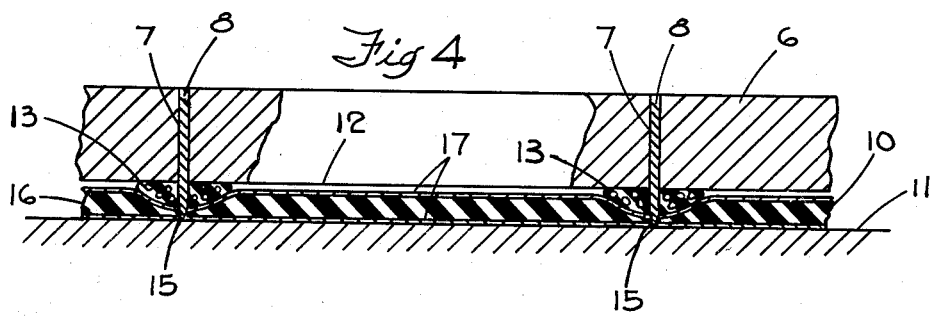
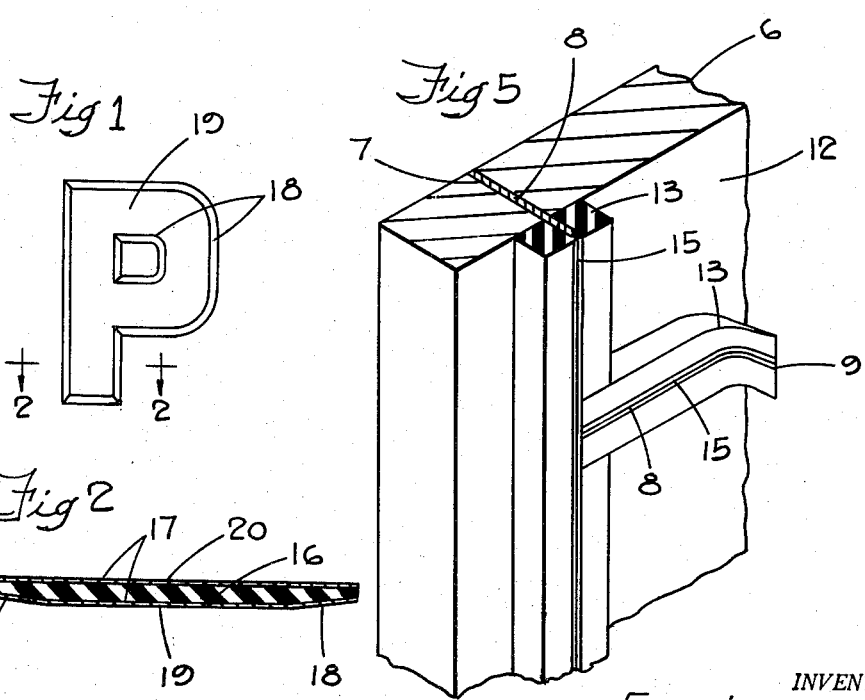
INVENTOR.
Francis S. Murphy
BY
Andrew H. Wintercorn
Atty.

United States Patent Office 2,988,835
Patented June 20, 1961

2,988,835
DIE-CUT LAMINATED BOARD LETTERS, FIGURES, WORDS, DESIGNS, ETC.
Francis S. Murphy, Rockford, Ill., assignor to Display Craft, Incorporated, Rockford, Ill., a corporation of Illinois
Filed July 30, 1958, Ser. No. 752,009
1 Claim. (Cl. 40—135)

This invention relates to letters, figures, words, designs, trademarks and so forth, made of plastic core sheet material.

The principal object of my invention is to produce in commercial quantities, at relatively low cost, attractive appearing letters, figures, words, designs, trademarks, and so forth suitable for advertising display purposes, both indoor and outdoor. The beveled edges, incorporated as a result of the die-cutting in a novel way, not only give an embossed effect for improved appearance, but also make for increased structural strength, while a flat back surface enables neater and more secure application of the letters, etc. to windows, walls, signs and other flat supporting surfaces.

While other laminated board or sheet materials may also be found suitable for the present purposes, I prefer one made of styrene type plastic foam sandwiched between kraft paper, which, in the heat-sealing thereof to the plastic core is impregnated, making it water-repellent. (This is not to say that dip, spray, or roller coating of the water repellent might not be practical other ways of water-proofing or further water-proofing the material.) The plastic core has been found to be ideal for the present purposes, because of its compressibility, and the fact that when compressed as herein disclosed it retains its compressed form satisfactorily.

The invention is illustrated in the accompanying drawing, in which—

FIG. 1 is a front elevation of a die-cut laminated letter made in accordance with my invention;

FIG. 2 is a cross-section on the line 2—2 of FIG. 1, shown substantially full size;

FIGS. 3 and 4 are cross-sections through a die-block and a co-operating bed-plate showing the die-cutting operation and illustrating how the compressed sponge rubber strips provided on the face of the die-block bordering the projecting steel cutter blades serve to compress the plastic foam core in the marginal portions of the die-cut letters, words, and so forth, simultaneously in the cutting of the paper coverings, and FIG. 5 is a perspective view of a portion of a die-block showing a typical arrangement of cutter blades and sponge rubber strips.

The same reference numerals are applied to corresponding parts throughout the views.

Referring to FIGS. 3, 4, and 5 the reference numeral 6 designates a die-block in which slots 7 are cut to receive flexible blades 8 with a press fit, the slots being straight or curved, and the blades 8 being straight, as seen at the left in FIG. 5, or flexed to match the curvature of the slot as indicated at 9 in FIG. 5, depending upon the from of the letter, word, design, or whatever else is to be cut from the laminated board material, a panel or sheet of which is indicated at 10 in FIG. 3 resting on the bed-plate 11. Cemented to the bottom face 12 of the die-block are narrow strips 13 of sponge rubber normally of rectangular cross-section and disposed on opposite sides of the projecting portion 14 of each of the cutter blades 8, the bottom surfaces of these strips normally lying substantially flush with the sharp knife edges 15 as shown in FIG. 3.

The specific laminated board sheet, or panel material shown at 10 comprises a styrene type plastic foam core 16 of uniform thickness which is heat-sealed to sheets of normally untacky kraft paper 17, and the latter is thereby rendered tacky and also impregnated sufficiently by the plastic material to make it water-repellent, substantially the same as the core. In the die-cutting of the material 10, the plastic core 16 is compressed next to the line of cutting by the rubber strips 13 to define beveled edges 18 peripherally of the letter, word, design or whatever has been cut, as illustrated in FIG. 1, giving the face 19 an embossed effect, for good appearance of the die-cut product and also to make for better structural strength and reduced likelihood of distortion. The back 20 of each letter, word, design, or whatever has been die-cut, is flat, enabling neater and more secure application to windows, walls, signs, and other flat supporting surfaces.

In operation, the die-block 6 is pressed down against the sheet or board material 10 in parallel relationship to the bedplate 11, so that the knife edges 15 cut through both paper coverings 17 and, of course, through the plastic core 16 therebetween. In this operation, the letter, word, or other character that is cut has the edges 18 bevelled uniformly by the compression of the sponge rubber strips 13. These, of course, are supported laterally only on one side by the projecting blades 8, and, consequently, are free to bulge only in the other direction, as seen in FIG. 4, when compressed in the cutting operation, thereby gradually decreasing the pressure applied to the sheet or board material inwardly from the line of cut and accordingly forming a neat bevel.

The present product has been found to be especially suitable for use in display booths at shows, but may be used for advertising display purposes generally, both indoors and outdoors, wherever a nice appearing, low cost, light weight display sign is desired. The water-repelling properties of the material make the present new product quite durable, even under the most adverse conditions. Advertisers who desire to change their display signs at regular intervals to relieve monotony find this product ideal for their advertising programs, because of its versatility and adaptability, combined with its low cost and neat and attractive appearance.

It is believed the foregoing description conveys a good understanding of the objects and advantages of my invention. The appended claim has been drawn to cover all legitimate modifications and adaptations.

I claim:

A light weight, low cost flat character for a display sign comprising a core of styrene foam providing a slightly resilient compressible water-repellent layer of uniform thickness covered on the front and back with sheets of flexible absorbent material that are impregnated with styrene material, the covering sheets defining the outline of the character, and the styrene material rendering the covering sheets water-repellent, and the edge portions of the character being compressed to bevelled form on the front to give an embossed effect to said character, the back of the character being flat from edge to edge throughout so as to enable easy application to a flat supporting surface.

References Cited in the file of this patent

UNITED STATES PATENTS

| | | |
|---|---|---|
| 2,194,570 | Schafer | Mar. 26, 1940 |
| 2,275,934 | Orbuckle | Mar. 10, 1942 |
| 2,533,609 | Nolan | Dec. 12, 1950 |
| 2,545,804 | Butler | Mar. 20, 1951 |
| 2,712,514 | English | July 5, 1955 |
| 2,768,460 | Northrup | Oct. 30, 1956 |
| 2,784,510 | Jaye | Mar. 12, 1957 |